United States Patent [19]

Mayo

[11] Patent Number: 4,570,836

[45] Date of Patent: Feb. 18, 1986

[54] FISH STRINGER

[76] Inventor: Ronnie D. Mayo, 1114 S. Petit, Hominy, Okla. 74035

[21] Appl. No.: 623,039

[22] Filed: Jun. 21, 1984

[51] Int. Cl.⁴ .............................................. A01K 65/00
[52] U.S. Cl. ...................................... 224/103; 224/253
[58] Field of Search ............... 224/103, 920, 253, 254, 224/232, 196, 251, 242, 245; 43/54.1

[56] References Cited

U.S. PATENT DOCUMENTS

| | | | |
|---|---|---|---|
| 675,118 | 5/1901 | Sweet | 224/245 |
| 1,417,759 | 5/1922 | McNiece | 224/103 |
| 2,089,139 | 11/1937 | Foley et al. | 224/232 X |
| 2,098,139 | 11/1937 | Foley et al. | 224/232 X |
| 2,310,204 | 2/1943 | Beckwith et al. | 224/232 |
| 2,455,766 | 12/1948 | Harvey | 224/103 |
| 2,518,541 | 8/1950 | Griffin et al. | 224/103 |
| 2,523,974 | 9/1950 | Stonich | 224/103 |
| 2,550,217 | 4/1951 | Bourque | 224/103 |
| 2,563,480 | 8/1951 | Montgomery, Sr. | 224/103 |
| 2,564,389 | 8/1951 | Boehm et al. | 224/103 X |
| 3,332,121 | 7/1967 | Curtis | 224/103 X |
| 3,381,807 | 5/1968 | DeVaughn | 224/232 X |

Primary Examiner—Stephen Marcus
Assistant Examiner—Robert Petrik
Attorney, Agent, or Firm—Head, Johnson & Stevenson

[57] ABSTRACT

A fish stringer assembly comprising a hollow closed housing having at least one open end for slidably receiving a spear member therein, a locking pin extends transversely across the housing for releasable engagement with the spear member in one relative position of the spear within the housing for locking the spear therein for providing a "safety" position for the spear when not in use, guide pin or guide pins extend transversely across the interior of the housing for facilitating insertion of and withdrawal of the spear from the interior of housing, the spear being provided with a point at the outer end thereof for piercing a fish in order to secure the fish to the fish stringer assembly, and a string or cord secures the spear to the housing and receives the fish from the spear for supporting the fish from the housing, the locking pin may be easily released from the locking engagement with the spear member by the use of a single hand of the user of the device thus facilitating the fish stringing operation.

1 Claim, 8 Drawing Figures

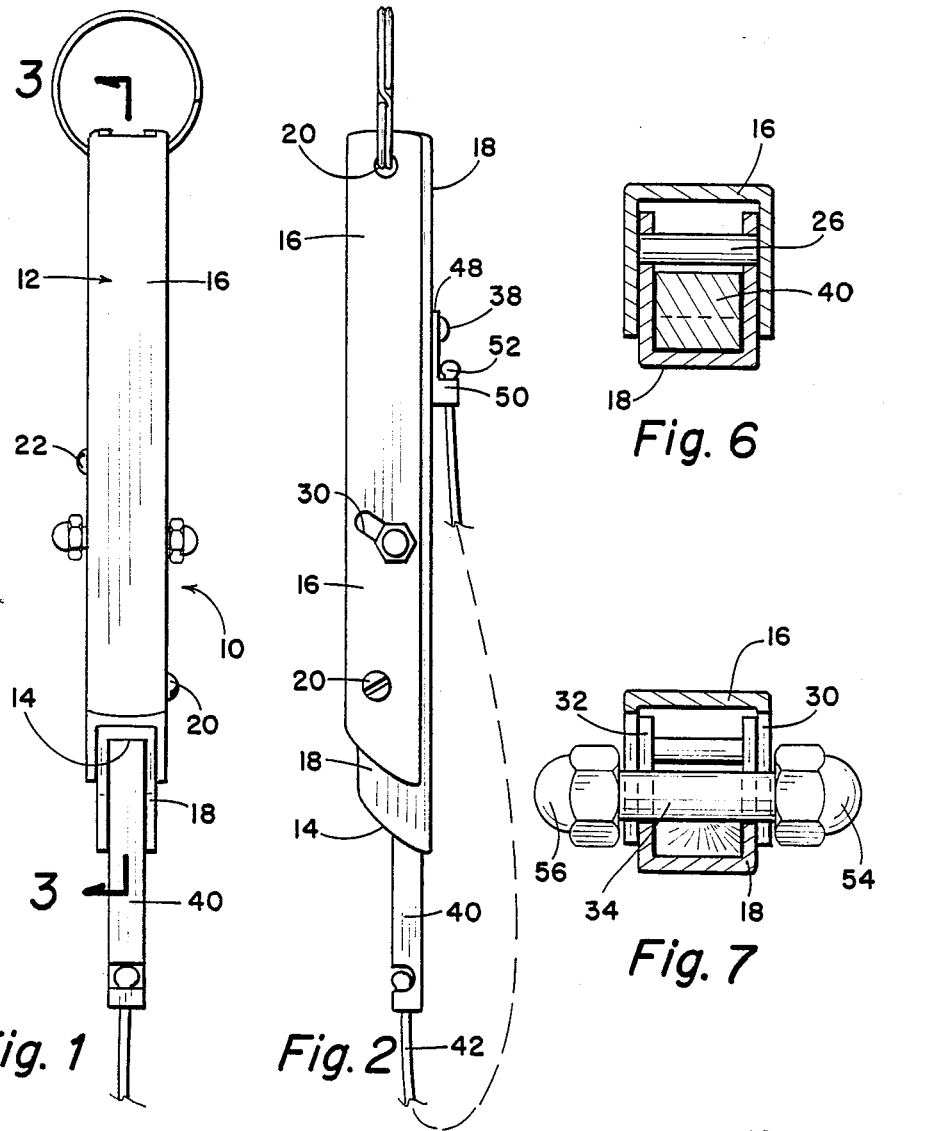
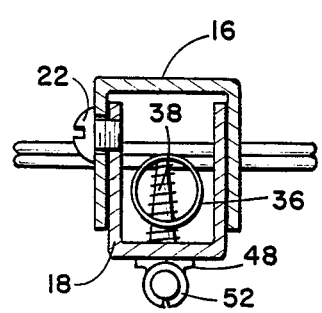
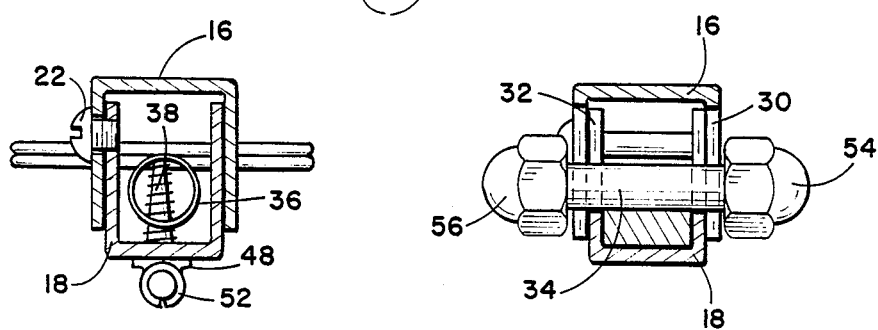

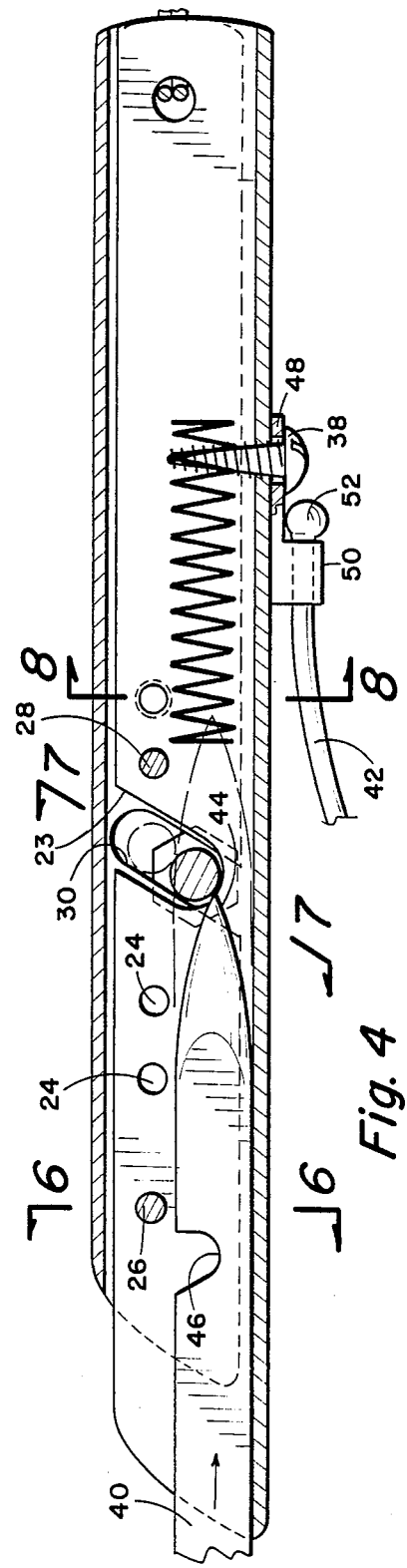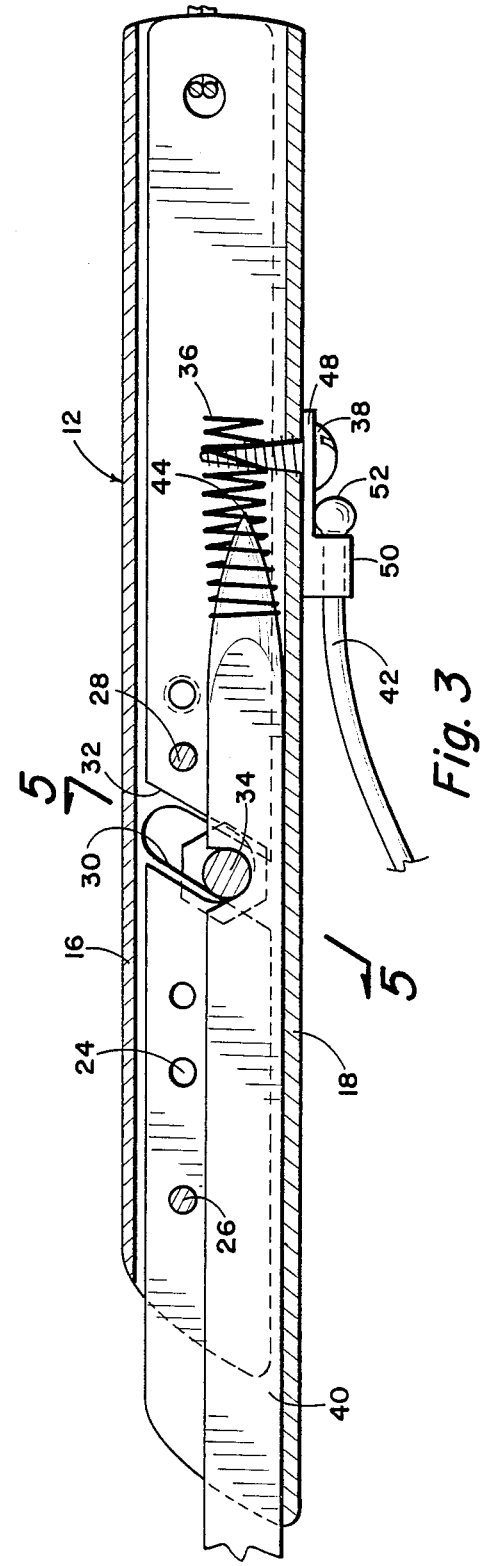

FISH STRINGER

BACKGROUND OF THE INVENTION

1. Field of the Invention

This invention relates to improvements in fishing devices and more particularly, but not by way of limitation, to a fish stringer for holding a fisherman's catch during a fishing operation.

2. Description of the Prior Art

Fish stringers are in widespread use by fishermen for the holding or storing of the caught fish during a fishing "outing" or the like until such time that the fish may be removed for a more permanent storage position or until they can be removed for eating, or the like. One type of stringer in common usage today comprises a length of rope or heavy cord having a plurality of hook members secured in spaced relation along the length thereof. A fish may be anchored or secured to each of the hooks. The storage of the stringer and fish carried thereby may present a problem in that the overall length of the stringer having the hooks secured thereto is frequently somewhat long and cumbersome to handle, and the securing of the fish thereto adds to the inconvenience of storage. Accordingly, it is common practice to suspend the string and fish carried thereby over the side or end of the fishing boat whereby the fish are stored in the water, or the string and fish secured thereto may be anchored along the shore with the fish suspended in the water, the entire catch and stringer being remotely disposed with respect to the fisherman. In addition it is usually somewhat difficult to secure the fish to the hooks of the stringer, and it usually requires both hands of the fisherman for the securing of the fish to the stringer. The disadvantages of the present day fish stringers will be apparent.

SUMMARY OF THE INVENTION

The present invention contemplates a novel fish stringer which has been particularly designed and constructed for overcoming the foregoing disadvantages. The novel fish stringer comprises a closed case means having at least one end thereof open for slidably receiving a spear means therein. The case means is provided with yieldable locking means secured within the interior thereof for removably securing the spear means in the case when the spear is not required for securing a fish to the stringer. The locking means may be readily released when the spear is to be removed from the case in order to secure a fish to the stringer assembly. The spear is secured to the outer periphery of the case by a suitable line or rope means and when a fish is to be secured to the stringer assembly, the spear may be removed from its stored position within the case and inserted through the fish in the usual or well known manner whereby the fish may be moved to the line or rope means to which the spear is secured. The fish may be hung from or stored on the rope means, and the spear may be returned to its locked storage position within the closed case means. Thus, there is no sharp point exposed which might be dangerous to the user of the device. In addition, the case may be secured to the belt, or the like, of the fisherman, or may be secured to the side of a fishing boat, or the like, or on a fishing dock, or staked out on the bank of the water wherein the fishing operation is taking place. The operation of the release of the spear means may be achieved by the use of a single hand of the user of the assembly, thus freeing the other hand for use of a fish net, fishing rod, or the like. The novel fish stringer is simple and efficient in operation and economical and durable in construction.

BRIEF DESCRIPTION OF THE DRAWINGS

FIG. 1 is a front elevational view of a fish stringer embodying the invention.

FIG. 2 is a side elevational view of a fish stringer embodying the invention.

FIG. 3 is an enlarged view taken on line 3—3 of FIG. 1 and shows the locked position of a spear means used in a fish stringer embodying the invention.

FIG. 4 is a view similar to FIG. 3, illustrating an unlocked or released position for a spear as used in a fish stringer embodying the invention.

FIG. 5 is a view taken on line 5—5 of FIG. 3.
FIG. 6 is a view taken on line 6—6 of FIG. 4.
FIG. 7 is a view taken on line 7—7 of FIG. 4.
FIG. 8 is a view taken on line 8—8 of FIG. 4.

DETAILED DESCRIPTION OF THE PREFERRED EMBODIMENT

Referring to the drawings in detail, reference character 10 generally indicates a fish stringer comprising a hollow case or sheath means 12 having at least one end 14 thereof open for providing access to the interior thereof. The casing 12 may be of any suitable construction and as shown herein comprises an elongated element 16 of a substantially U-shaped cross sectional configuration having a second elongated element 18 of substantially U-shaped cross sectional configuration pivotally secured thereto in the proximity of one end thereof as shown at 20. The two U-frames or U-shaped elements 16 and 18 are disposed in such a manner that one of the elements, such as the element 16, to provide a closed outer periphery for the case 12 while providing the said one open end 14 therefor. In order to accomplish this, it is preferable that the width of the one element 16 be somewhat less than the width of the other element 18 in order that the element 18 may be easily positioned within the element 16. The two elements 16 and 18 are retained in a normally engaged and closed position by means of suitable screws 20 and 22, or the like.

A plurality of axially aligned apertures 24 are longitudinally arranged along the sidewalls of the U-shaped element 18. A first suitable guide pin means 26 may be suitably secured between a first pair of the axially aligned apertures 24, and a second suitable guide pin means 28 may be similarly secured between a second pair of the axially aligned apertures 24. The provision of the plurality of pairs of axially aligned apertures 24 provides for alternate positions for the guide pins 26 and 28. As particularly shown in FIGS. 3 and 4, it may be preferable to place the first guide pin means 26 in the outermost pair of aligned apertures 24 and the second guide pin means 28 in the innermost pair of aligned apertures 24, but there is no intention of limiting the invention to any particular longitudinal relationship for the guide pins 26 and 28 provided within the case 12 for a purpose as will be hereinafter set forth.

A pair of aligned angularly extending slots 30 are provided in the sidewalls of the U-shaped casing element 16, the slots 30 having the inner ends thereof closed and the outer ends thereof open. A pair of complementary aligned angularly extending slots 32 are similarly provided on the sidewalls of the casing element 18 and have the inner ends thereof closed and the outer ends thereof open. When the elements 16 and 18 are in the normally closed position therebetween, the slots 30 and 32 are in substantial alignment with one another for slidably receiving a locking pin means 34 therein. The locking pin means 34 is freely slidable within the aligned slots 30 and 32, and in the normal position of the casing 12, the locking pin means 34 is retained in engagement with the closed end of the slot 34 in a manner and for a purpose as will be hereinafter set forth. In addition, a suitable helical spring means 36 is disposed within the casing 12 in spaced relation inboard of the locking pin means 34 and may be retained in position in any suitable manner, such as by a screw means 38 extending through the wall of the housing 18 and into the interior of the closed casing 12.

An elongated spear means 40 is adapted to be slidably inserted within and withdrawn from the interior of the casing 12. The spear means 40 has the inner end thereof suitably secured to a strong cord, rope, string, or the like, 42 and the opposite or outer end thereof is sharped to a point as shown at 44. The point 44 is sufficiently sharp as to penetrate or pierce a fish (not shown) when "stringing" the captured fish onto the device 10 as will be hereinafter set forth. In addition, a recess means 46 is provided along one side edge of the spear means 40 and is closed at one end and open at the opposite end thereof for receiving the locking pin means 34 therein in one relative position between the spear means 40 and the casing 12. As hereinbefore set forth, one end of the cord or rope means 42 is secured to the inner end of the spear 40, and the opposite end of the rope means may be secured to the outer periphery of the casing 12 in any suitable manner. As shown herein, a plate member 48 having a sleeve member 50 secured thereto or integral therewith may be secured to the outer periphery of the casing element 18 by the screw means 38. The rope 42 passes through the sleeve 50, and may be provided with a suitable enlarged stop means, such as a knob 52, or the like, for retaining the rope 42 within the sleeve 50.

When the spear means is not in use, it may be moved longitudinally through the open end 14 of the casing 12 until the point means 44 engages the spring 36, as particularly shown in FIG. 3. When the spear 40 has been inserted into the interior of the casing 12 a sufficient distance, the recess 46 will be moved into substantial alignment with the recesses 30 and 32, and the locking pin 34 will drop into the recess 46 for securing the spear 40 within the closed casing 12. The locking pin means 34 extends transversely through the casing elements 16 and 18, and beyond the outer periphery of each whereby each end of the locking pin 34 may be provided with suitable knob means or head members 54 and 56. The position of the locking pin 34 within the recesses 30, 32 and 46 in combination with the force of the spring means 36 acting longitudinally against the spear member 40 securely retains the locking pin 34 in position for retaining the spear in the "safety" position therefor where the point 44 is encased within the casing 12 for precluding accidental engagement thereof by the user of the device 10. In order to release the spear 40 from the casing 12, it is merely necessary to manually engage either or both of the knob means 54 and 56 and slide the locking pin out of engagement with the recess 46, whereupon the force of the spring 36 moves the spear 42 to a first position within the casing 12, as shown in broken lines in FIG. 4. The spear 40 may then be grasped manually and completely withdrawn from the sheath or case 12 for use in the stringing of a fish onto the device 10.

In use, the spear 40 may be removed from the "safety" position thereof encased within the sheath 12, and the point 44 thereon may be inserted into or through the captured fish. The fish may then be "threaded" onto or moved along the string or rope means 42 for intermediate storage of the fish until such time as the fish may be properly stored for future use, or cleaned for cooking, as is well known. When the fish has thus been "strung" onto the device 10, the spear 40 may be inserted into the interior of the casing 12 as hereinbefore set forth, and locked in the "safety" position therefor until such time that it is desirable to string another fish onto the device 10. The guide pins 26 and 28 facilitate the insertion of the space into the sheath 12. Upon the need for adding additional fish to the stringer device 10, the process may be repeated until all of the captured or caught fish have been secured to the stringer device 10, or until the device 10 is sufficiently full as to preclude the accommodation of any additional fish.

The latching of the spear 40 in the "safety" position therefor is automatic, and the spear may be quickly and easily released from the locked position by a single hand of the user of the device 10. The encasing of the sharp point of the spear provides a safety feature for the apparatus 10, and the simplicity and ease of use of the device greatly facilitates the fish stringing operation. In addition, it is preferable that the fish stringing apparatus 10 be constructed from a suitable lightweight material, such as aluminum, or the like, by a well known machining-type operation. Thus, the device 10 will resist both corrosion and breakage in use as well as provide a lightweight tool for the use of a fisherman.

From the foregoing, it will be apparent that the present invention provides a novel fish stringer comprising a closed housing having one end open for receiving a spear means therein, yieldable locking means is provided within the casing for securing the spear in a "safety" position therein during periods of non-use of the spear means, the locking means being readily releasable for removal of the spear from the casing in order to pass the spear into or through a fish for securing the fish to the stringer assembly. The novel fish stringer may be actuated by one hand of the user, thus freeing the other hand for use of a fish net, fishing rod, or the like.

Whereas the present invention has been described in particular relation to the drawings attached hereto, it should be understood that other and further modifications, apart from those shown or suggested herein may be made within the spirit and scope of this invention.

What is claimed:

1. A casing means comprising:
   a first elongated U-shaped element;
   a pair of complimentary aligned angularly extending slots in the side wall of said first elongated U-shaped element having their inner ends closed and the outer ends opened;
   a second elongated U-shaped element forming a trough sufficiently large to receive said first elongated U-shaped element;
   pivot menas connecting one end of each of said first and second elongated U-shaped element;
   a second pair of angularly extending slots having their inner ends closed and the outer ends open and aligned with said angular slots in said first elongated U-shaped element, said second angularly extending slots sloping back toward said pivot means such that the open ends of said second pair of slots are closer to said pivot means than are said closed ends;

a locking pin means freely slidable within the aligned slots;

a helical spring means retained within said first elongated U-shaped element;

spear means secured to the casing means and movable independently with respect thereto, the spear means being adapted for insertion through and withdraw from the open end of the first elongated U-shaped element;

said spear means having a notch opening in one side thereof such that when it is inserted against said helical spring that said locking pin means is engagable with said notch, said helical spring means urging said spear outwardly thus securing the locking engagement between said locking pin means and said spear means;

cord means extending between the spear means and one of said elongated U-shaped elements.

* * * * *